(Model.)

W. H. PARRISH.
COMBINED HEADER AND THRASHER.

No. 259,201. Patented June 6, 1882.

Attest:

Inventor
Wm. H. Parrish
By H. T. Abbot
Asso. Atty.

(Model.)

W H. PARRISH.
COMBINED HEADER AND THRASHER.

No. 259,201. Patented June 6, 1882.

4 Sheets—Sheet 2.

Attest:
H. E. Pennie
A.W.

Inventor.
Wm H Parrish
By H. T. Abbot
Asso Atty.

(Model.)

W. H. PARRISH.
COMBINED HEADER AND THRASHER.

No. 259,201. Patented June 6, 1882.

Attest:
H. L. Perrine.

Inventor
Wm. H. Parrish
By H. T. Abbot
Asso. Atty.

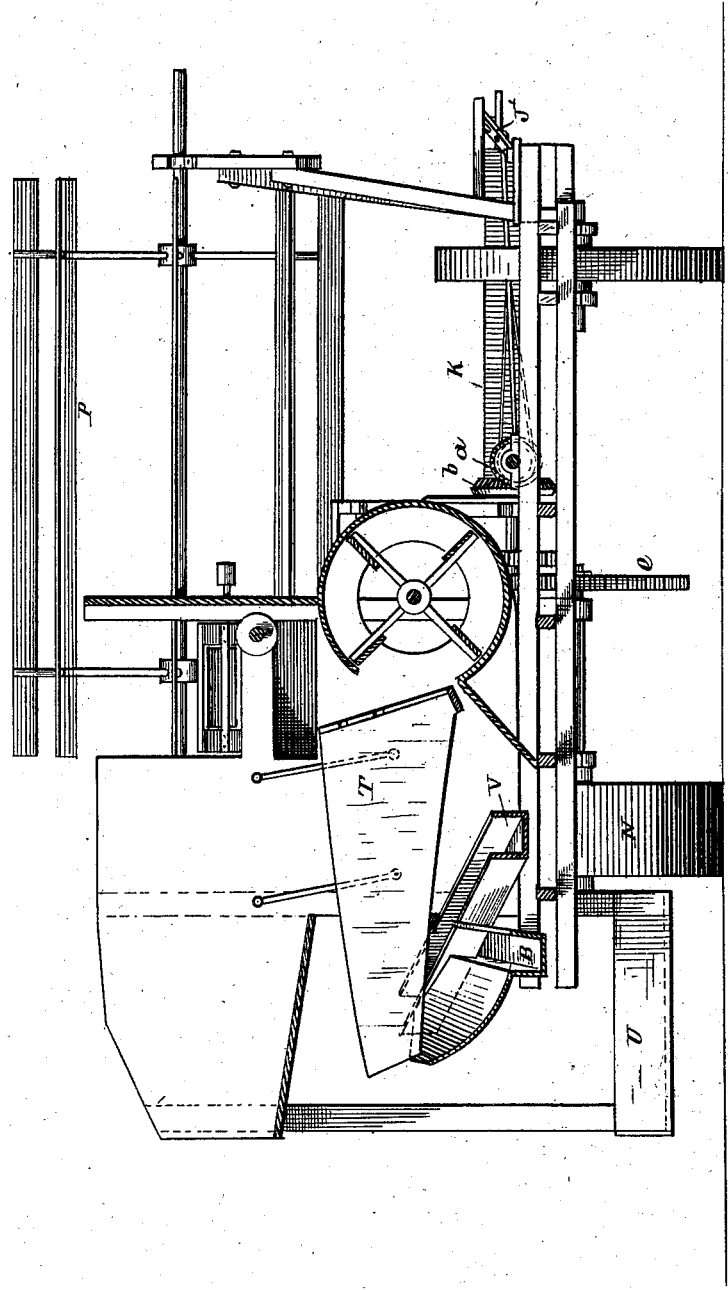

UNITED STATES PATENT OFFICE.

WILLIAM H. PARRISH, OF SALEM, OREGON, ASSIGNOR OF ONE-HALF TO GEO. E. AIKEN, OF SAME PLACE.

COMBINED HEADER AND THRASHER.

SPECIFICATION forming part of Letters Patent No. 259,201, dated June 6, 1882.

Application filed August 10, 1880. (Model.)

*To all whom it may concern:*

Be it known that I, WILLIAM H. PARRISH, of Salem, Marion county, State of Oregon, have invented a certain new and useful Improvement in Combined Header and Thrasher, or that class of machines which cut, thrash, and separate the grain from the straw by one continuous process; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to combined headers and thrashers. The object of it is to produce such a machine as shall be of small dimensions, light weight, easy draft, and that can be easily operated and managed by one man, and drawn by a team of from two to four horses, as the machine is intended to cut only from four to six feet; and it consists in the construction and combination of parts hereinafter particularly described, and then specifically defined by the claims.

Figure 1:
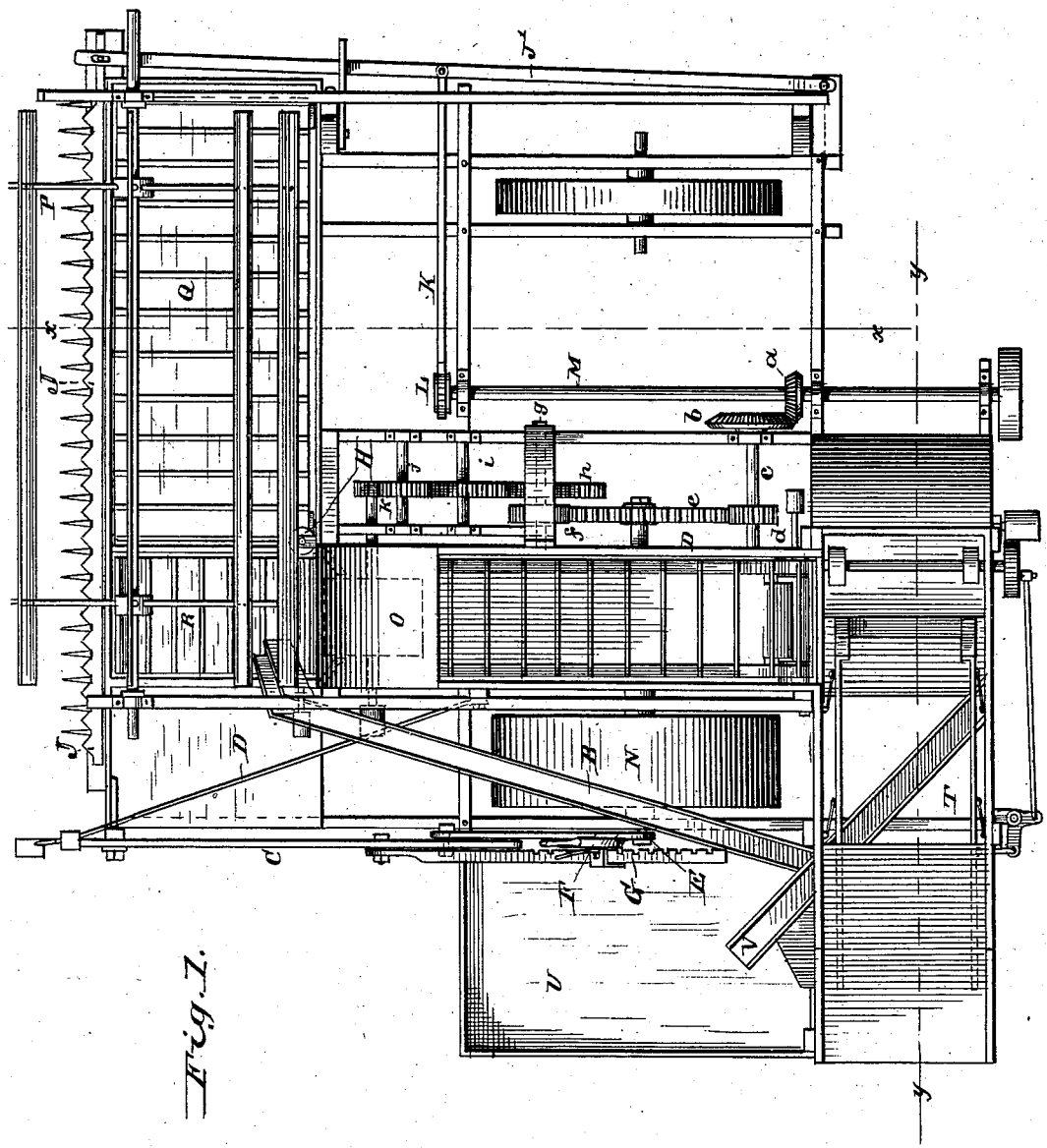
Figure 2:
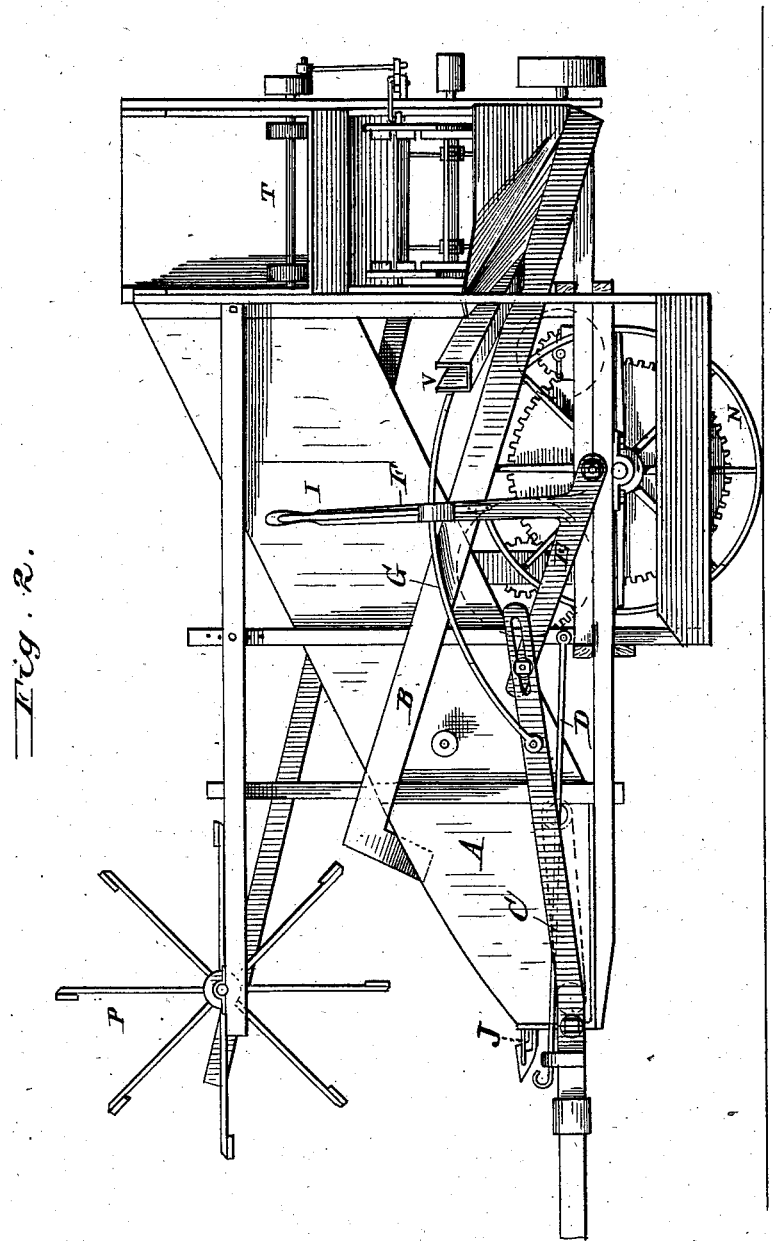
Figure 3:
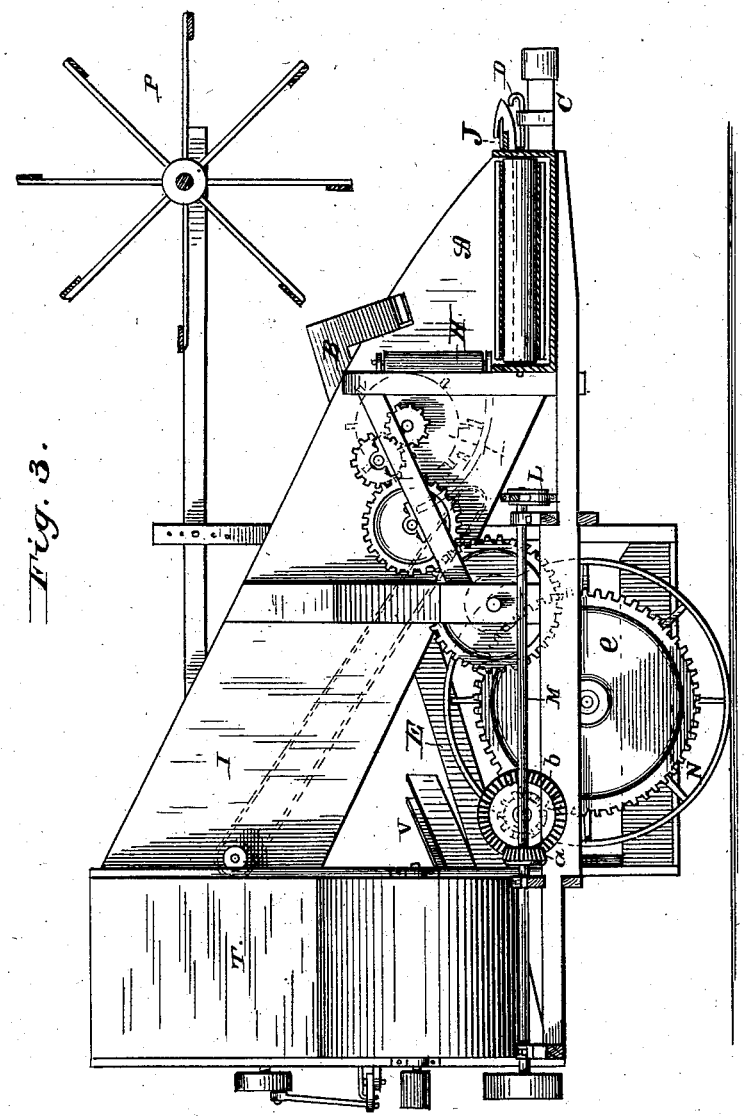

In the accompanying drawings, Figure 1 is a plan view of the machine. Fig. 2 is a side elevation, looking from the side to which the pole is attached. Fig. 3 is a side sectional elevation on the line $x\ x$ of Fig. 1, and Fig. 4 is rear sectional elevation on the line $y\ y$ of Fig. 1.

In the accompanying drawings, the letter J indicates the cutter, which is attached at one end to the pivoted lever J', which is reciprocated by the rod K, connected to the eccentric L on the end of shaft M. This shaft is revolved by pinion $a$ thereon, which meshes with pinion $b$ on shaft $c$. This shaft receives its motion through a gear, $e$, on the shaft of the driving-wheel N, and that gear, through pinions $f$ and $h$ on shaft $g$, imparts motion through pinions $i$ and $j$ to pinion $k$ on the shaft of cylinder O.

The grain as it is cut is thrown by reel P upon the draper or apron Q, and by that apron carried forward to apron R, which moves at right angle to apron Q and delivers the straw and grain to the toothed cylinder O, journaled in the lower end of the conveyer-trough I, in which is an endless apron that carries the grain and straw to its upper end, where the grain falls out onto the sieves of the separator-shoe T and the straw is carried off to one side of the machine, at its rear.

The details of construction of the separator will not be herein described, because my invention does not relate specifically thereto, and any well-known construction may be employed.

The grain-board A, which may be a continuation of one side of trough I, is placed along the side of apron R next toward the draft-pole, so as to prevent the grain from passing from off the machine at that end as it is received onto the apron R, and so as to hold it in place and in readiness for the cylinder O.

The trough B extends from directly under the riddles or shoe of the separator forward to the apron R and over the top of the grain-board, so as to convey the tailings that run over the riddle-board back to the cylinder O, and pass them up to the separator again. The trough B is provided with an apron or screen or other suitable means for conveying the tailings forward to the cylinder.

The pole C is slightly curved or bent upward at its rear end, and pivoted (at about the point it begins to curve) to the front of the machine, at the left-hand side thereof. The rear of the pole is slotted, and a pin or bolt passing through the slot connects the pole with the angular bar or lever E F, which is fulcrumed to the timber that supports the driving-wheel. The handle F of the lever is within easy reach of the operator, and is provided with a spring-detent lever which works back and forth upon a curved notched bar, G, the said spring-detent engaging with the notched bar, so as to hold the lever at the desired point. The bar G is hinged at its front end to the pole C, near the rear end of the pole, and passes through a sleeve or keeper on the handle F. By means of lever E F the tongue or pole C is thrown at a greater or less incline, so as thereby to regulate the pitch of the machine, and through it the point at which the straw shall be cut, and by the same means the machine is relieved from strain when passing over obstructions on rough ground.

The upright roller H is journaled vertically, and to one side of the trough I, as illustrated, so as to act as a fender to prevent the grain catching at its turn, and to direct it smoothly on its course.

By locating the pole at the front and side of the machine one man is enabled to manage the team, look after the filling of the bags, change the pitch of the machine, and perform whatever is necessary to the working of the machine without the aid of other persons.

The platform U is located in the angle formed by trough I and the separator, so as to place the operator within easy reach of the lever by which the pole C is operated, so that he may give his attention to the filling of the bags with grain delivered through the trough V from the separator.

I do not in this application claim a combined header and thrasher having a conveyer and straw-carrier arranged at right angles to each other, a platform located at the angle of the conveyer-trough and supporting-frame of the straw-carrier for an attendant, for the reason that this feature is claimed in my application filed May 24, 1880.

Having described my invention, what I claim is—

1. The combination of aprons Q and R, reel J, cylinder O, trough I, roller H, located at one side and to the front of trough I, and grain-board A, at the other side of said trough and along the outer edge of apron R, whereby the grain is prevented from catching at the turn and is directed evenly to the cylinder O, substantially as set forth.

2. The combination of pole C, hinged to the side of the machine, the lever E F, jointed to said pole at its rear end, and provided with a spring-detent and a device for the detent to engage with, whereby the pitch of the machine may be adjusted, substantially as set forth.

3. The combination of the pole C, lever E F, notched bar G, connected at one end to pole C, and a spring-detent to engage with said bar, substantially as and for the purpose specified.

4. The combination of trough I, a separator at the top of and at right angles to said trough, a platform, U, located in the angle formed by said trough and separator, trough V for delivering the grain from the separator to the platform, and pole C, pivoted or hinged to the front and side of the machine, and at its rear end to lever E F, whereby the operator will be within reach of the said several parts, substantially as set forth.

In testimony that I claim the foregoing I have hereunto set my hand and seal this 13th day of May, 1880.

WILLIAM H. PARRISH. [L. S.]

Witnesses:
 HUGH V. CORCORAN,
 ELIHU B. STOWE.